(12) United States Patent
Dasgupta et al.

(10) Patent No.: US 9,137,489 B2
(45) Date of Patent: *Sep. 15, 2015

(54) PLATFORM FOR END POINT AND DIGITAL CONTENT CENTRIC REAL-TIME SHARED EXPERIENCE FOR COLLABORATION

(71) Applicant: ITTIAM SYSTEMS PTE. LTD., Singapore (SG)

(72) Inventors: Sattam Dasgupta, Bangalore (IN); Anil Kumar Agara Venkatesha Rao, Bangalore (IN); Shantanu Bhaduri, Bangalore (IN); Anirudh Seth, Gurgaon (IN); Sriram Sethuraman, Bangalore (IN)

(73) Assignee: ITTIAM SYSTEMS PTE. LTD., Singapore (SG)

( * ) Notice: Subject to any disclaimer, the term of this patent is extended or adjusted under 35 U.S.C. 154(b) by 72 days.

This patent is subject to a terminal disclaimer.

(21) Appl. No.: 13/965,240

(22) Filed: Aug. 13, 2013

(65) Prior Publication Data

US 2014/0184720 A1 Jul. 3, 2014

Related U.S. Application Data

(63) Continuation-in-part of application No. 13/763,739, filed on Feb. 11, 2013.

(30) Foreign Application Priority Data

Dec. 28, 2012 (IN) .......................... 5495/CHE/2012
Mar. 28, 2013 (IN) .......................... 1425/CHE/2013

(51) Int. Cl.
*H04N 7/14* (2006.01)
*H04N 7/15* (2006.01)
*H04L 12/18* (2006.01)
*H04L 29/06* (2006.01)

(52) U.S. Cl.
CPC .............. *H04N 7/15* (2013.01); *H04L 12/1818* (2013.01); *H04L 65/1066* (2013.01); *H04L 65/4046* (2013.01); *H04L 65/403* (2013.01)

(58) Field of Classification Search
USPC ....................................... 348/14.01
See application file for complete search history.

(56) References Cited

U.S. PATENT DOCUMENTS

| | | | |
|---|---|---|---|
| 8,208,000 B1 * | 6/2012 | Swanson et al. ........... | 348/14.08 |
| 8,471,890 B1 * | 6/2013 | Golas ......................... | 348/14.08 |
| 2009/0210491 A1 * | 8/2009 | Thakkar et al. ................ | 709/204 |
| 2010/0333127 A1 * | 12/2010 | Scott et al. ...................... | 725/24 |
| 2012/0082226 A1 * | 4/2012 | Weber ...................... | 375/240.12 |

(Continued)

*Primary Examiner* — Maria El-Zoobi
(74) *Attorney, Agent, or Firm* — Prakash Nama; Global IP Services, PLLC

(57) ABSTRACT

A platform for end point and digital content centric real-time shared experience for collaboration across endpoints is disclosed. In one embodiment, media centric collaboration terminals (MCCTs) are communicatively connected to one or more terminals selected from the group consisting of video communication terminals (VCTs), voice over Internet protocol (IP) communication terminals (VoCTs), remote servers, remote streaming clients and/or appliances, machines and gadgets (AMGs) via a communication network. Further, audio and/or video bridging of one or more audio and/or video streams originating from one of the MCCTs designated as a current host along with incoming audio and/or video streams from at least one of any remaining MCCTs designated as clients or the one or more terminals is enabled on the current host, via the communication network.

42 Claims, 11 Drawing Sheets

(56) References Cited

U.S. PATENT DOCUMENTS

2012/0306993 A1* 12/2012 Sellers-Blais .............. 348/14.08
2013/0339159 A1* 12/2013 Shaikh et al. .............. 705/14.73
2014/0168354 A1* 6/2014 Clavel et al. ............... 348/14.09

* cited by examiner

PLATFORM FOR END POINT AND DIGITAL CONTENT CENTRIC REAL-TIME SHARED EXPERIENCE FOR COLLABORATION

Benefit is claimed under 35 U.S.C. §120 to Indian Non-Provisional Application Ser. No. 1425/CHE/2013 entitled "PLATFORM FOR END POINT AND DIGITAL CONTENT CENTRIC REAL-TIME SHARED EXPERIENCE FOR COLLABORATION" by ITTIAM SYSTEMS PTE. LTD. filed on Mar. 28, 2013, to Indian Non-Provisional Application Ser. No. 5495/CHE/2012 entitled "SYSTEM, METHOD AND ARCHITECTURE FOR IN-BUILT MEDIA ENABLED PERSONAL COLLABORATION ON ENDPOINTS CAPABLE OF IP VOICE VIDEO COMMUNICATION" by ITTIAM SYSTEMS PTE. LTD. filed on Dec. 28, 2012 and to U.S. patent application Ser. No. 13/763,739 entitled "SYSTEM, METHOD AND ARCHITECTURE FOR IN-BUILT MEDIA ENABLED PERSONAL COLLABORATION ON ENDPOINTS CAPABLE OF IP VOICE VIDEO COMMUNICATION" by ITTIAM SYSTEMS PTE. LTD. filed on Feb. 11, 2013.

FIELD OF TECHNOLOGY

Embodiments of the present subject matter relate to collaboration across end points. More particularly, embodiments of the present invention relate to end point and digital content centric collaboration across the end points that are capable of Internet protocol (IP) audio and/or video communication.

BACKGROUND

With continued globalization the need for personal and business interaction between people in real-time over long distances is steadily increasing and also demanding change in the nature of interaction especially with respect to content. Voice communication remains the primary mode for achieving communication. However, increasingly the voice communication is being supplemented by chat sessions including text, audio and video. Lately, there has also been an increasing usage of video conferencing for an improved quality of interaction using software applications like Skype™ to high end dedicated conferencing setups like in tele-presence. Such software also complements the voice and video communication with information sharing, bringing elements of collaboration into the experience.

Despite such advances, the interactions between people in real-time are primarily limited to increased effectiveness in communication with a degree of sharing content of interest between people located at different places. Such interactions have not been able to achieve a shared experience people get in real-time when they are located at the same place. In recent years, new products and services, such as Hangout™ from Google™ allow sharing of audio, video, and image content with video conferencing to enhance the collaboration experience. However, existing products and/or services offer centralized server based services where conferencing and collaboration functions are done on servers. This also requires the users to upload the content to the servers. U.S. patent application Ser. No. 13/763,739 describes a technique that does the conferencing and collaboration functions on the end point exploiting their increasing processing capacity and hence gives the user an option of not having to upload the contents to the servers. Thus, reducing overall latency and improving user experience. However, this technique offers limited flexibility and control both on the host and clients for collaboration given the pre-defined nature of content sharing as full or partial screen sharing.

BRIEF DESCRIPTION OF THE DRAWINGS

Embodiments of the present invention are illustrated by way of an example and not limited to the figures of the accompanying drawings, in which like references indicate similar elements and in which.

DETAILED DESCRIPTION

A platform for end point and digital content centric real-time shared experience for collaboration is disclosed. In the following detailed description of the embodiments of the invention, reference is made to the accompanying drawings that form a part hereof, and in which are shown, by way of illustration, specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined by the appended claims.

The term "end points" refers to video communication terminals (VCTs), voice over Internet protocol (IP) communication terminals (VoCTs), and media centric collaboration terminals (MCCTs) which can be standalone or part of any appliances, machines or gadgets (AMGs). Exemplary VCTs include terminals capable of video communication over IP including desktop video phones, mobile or cell phones, tablets, stand-alone or in-built video conferencing units and the like. The VoCTs include stand-alone or in-built terminals capable of audio communication over IP. The term "bridge" refers to conferencing more than two end points capable of communication over IP.

The terms "signal" and "stream" are used interchangeably throughout the document. Further, the terms "end points" and "participants" are used interchangeably throughout the document. Also, the terms "audio" and "voice" are used interchangeably throughout the document.

Figure 1:
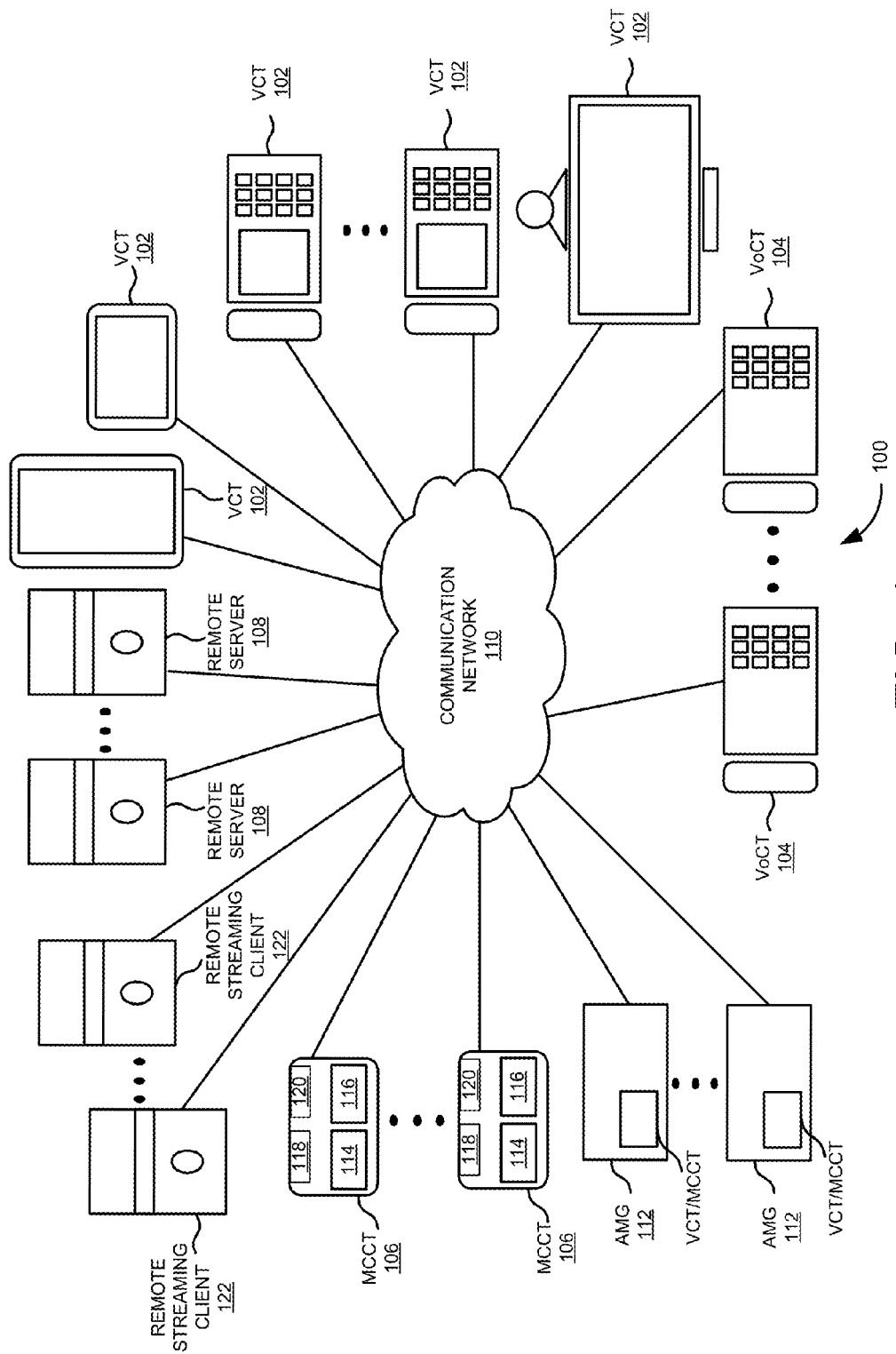
FIG. 1 illustrates a block diagram of a system for end point and digital content centric real-time shared experience for collaboration across end points, according to one embodiment.

FIG. 1 illustrates a block diagram of a system 100 for end point and digital content centric real-time shared experience for collaboration across end points, according to an embodiment. As shown in FIG. 1, the system 100 includes one or more MCCTs 106, one or more VCTs 102, one or more VoCTs 104, one or more remote servers 108, one or more remote streaming clients 122 and/or one or more AMGs 112 embedded with VCTs 102 or MCCTs 106. Further, each of the MCCTs 106 include a window management module (WMM) 114, a media centric collaboration enabling audio and/or video bridging module (MCAVBM) 116 and an application programming interface (API) 118 for application developers to build their own applications and integrate with the MCCT 106 and an API 120 for Internet service providers (ISPs), enterprise customers or any centralized controller to control functionalities, permissions, performance and the like, of the MCCTs 106, to be offered to subscribers or users based on configuration settings. For example, the MCCTs 106 can be implemented as software, hardware or a combination of software and hardware. For example, each of the MCCTs 106 is a platform for the end point and digital content centric real-time shared experience for collaboration. In one example, the MCCTs 106 can be installed in any other VCTs 102 and/or VoCTs 104 to act as a MCCT.

In operation, MCCTs 106 are communicatively connected to the VCTs 102, the VoCTs 104, the AMGs 112, the remote servers 108, and/or the remote streaming clients 122, via a communication network 110. For example, the communication network 110 includes an IP network and the like. Further, one of the MCCTs 106, designated as a current host, enables audio and/or video bridging of one or more audio and/or video streams originated from the current host along with incoming audio and/or video streams from remaining MCCTs 106 designated as clients, the VCTs 102, the VoCTs 104, the one or more AMGs 112, and/or the remote servers 108, via the communication network 110, to achieve end point and digital content centric real-time shared experience for collaboration amongst two or more participants. In one example, any one of the MCCTs 106 standalone or embedded in the AMGs can designate as the current host. In an example embodiment, the content coming from the remote servers 108 is a streamed audio/video signal or a remote session being achieved using a custom application or a commercially available application like a remote desktop protocol (RDP) or JoinMe that enables the remote session.

In one embodiment, the MCAVBM 116 residing in the current host enables audio and/or video bridging on the current host of the one or more audio and/or video streams of its stored or captured digital content and/or application(s) along with the incoming audio and/or video streams from the remaining MCCTs 106 designated as the clients, the VCTs 102, the VoCTs 104, the AMGs 112, and/or the remote server 108, via the communication network 110, to achieve the end point and digital content centric real-time shared experience for collaboration amongst two or more participants. This is explained in more detail with reference to FIG. 2. Further, the MCAVBM residing in the MCCTs designated as the clients enables the multi-stream encoding, decoding and composition of the audio and/or video streams for display as per user defined and/or predefined configuration settings which can be defined locally and/or in a centralized place.

Figure 2:
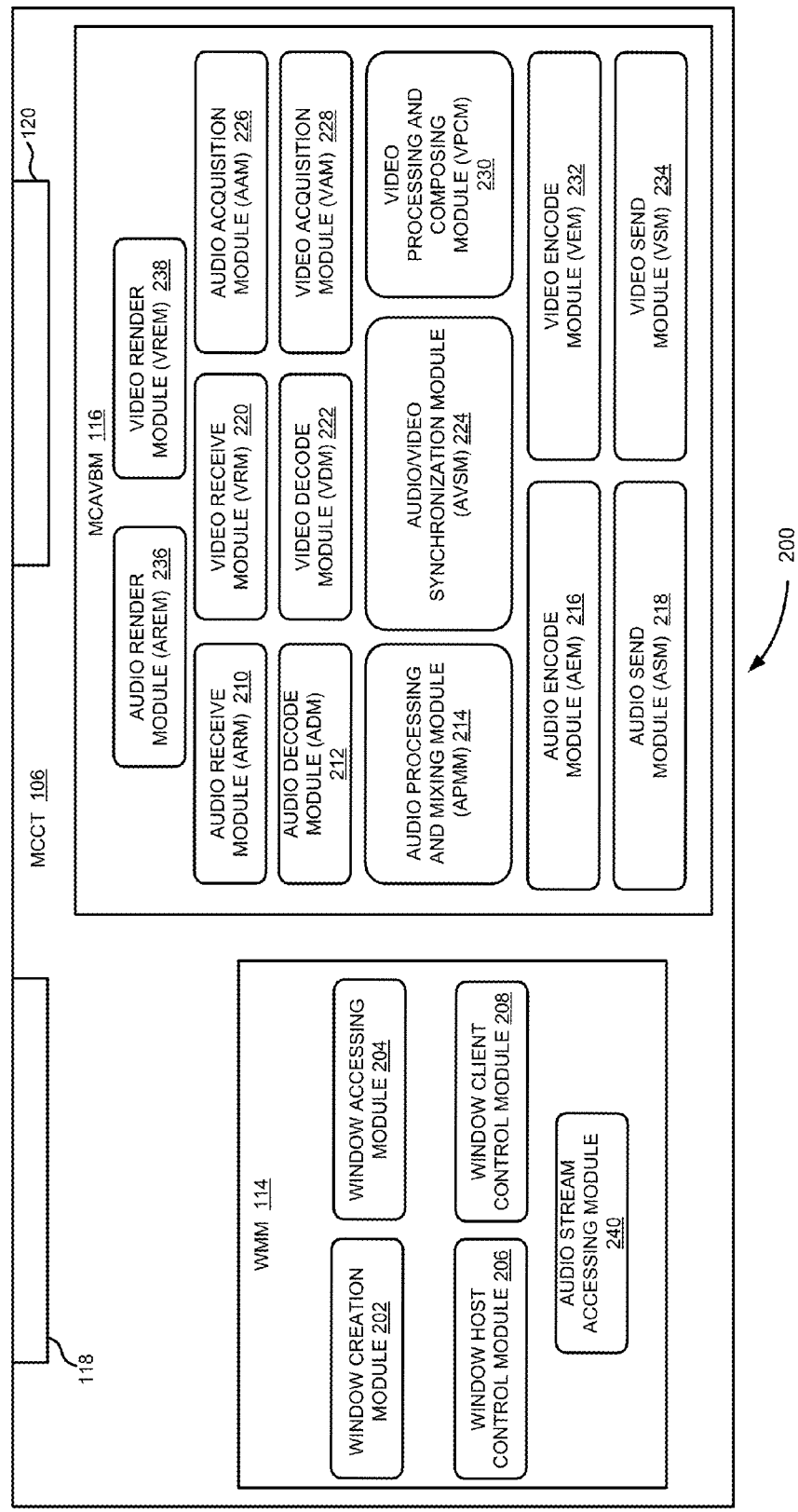
FIG. 2 is a block diagram illustrating major functional sub-components of a window management module (WMM) and a media centric collaboration enabling audio and/or video bridging module (MCAVBM) those reside in each of one or more media centric collaboration terminals (MCCTs), such as those shown in FIG. 1, according to one embodiment.

Referring now to FIG. 2, which is a block diagram 200 that illustrates major functional sub-components of the WMM 114 and MCAVBM 116 residing in each of the MCCTs 106, such as those shown in FIG. 1, according to one embodiment. As shown in FIG. 2, the MCCT 106 includes the WMM 114, MCAVBM 116, the API 118 for application developers and the API 120 for ISPs, enterprise customers or any centralized controller. For example, the MCCT 106 is the one of the MCCTs 106 designated as the current host.

Furthermore, the WMM 114 includes a window creation module 202, a window accessing module 204, a window host control module 206, a window client control module 208 and an audio stream accessing module 240. Further, the MCAVBM 116 includes an audio receive module (ARM) 210, an audio render module (AREM) 236, an audio decode module (ADM) 212, an audio processing and mixing module (APMM) 214, an audio encode module (AEM) 216, an audio send module (ASM) 218 to receive, render, decode, process and send the audio streams. Furthermore, the MCAVBM 116 includes a video receive module (VRM) 220, a video render module (VREM) 238, a video processing and composing module (VPCM) 230, a video decode module (VDM) 222, a video encode module (VEM) 232, and a video send module (VSM) 234 to receive, render, process, compose, decode, encode and send the video streams. In addition, the MCAVBM 116 includes an audio and/or video synchronization module (AVSM) 224 for synchronizing each of decoded audio and/or video streams of each participant connected to the current host before local play out. Moreover, the MCAVBM 116 includes an audio acquisition module (AAM) 226 and a video acquisition module (VAM) 228 for acquiring audio from one or more audio channels or video from one or more video channels, respectively, on the current host.

In one embodiment, the WMM 114 creates and assigns windows to a plurality of applications running on the current host, accesses input/output buffer(s) of the applications and controls the windows. In one example, in case of an operating system (OS) that already offer the creation, assignment and access like Windows™, the WMM 114 function is limited to accessing them. In an OS like Android™, where the windowing functionality is not natively available (till version 4.2), the WMM 114 provides, window creation, assignment and access to buffers including the input/output buffer(s).

In one exemplary embodiment, the window creation module 202 creates and assigns the window to each of the plurality of applications running on the current host. Further, the window accessing module 204 accesses one or more input/output buffers associated with each of the plurality of applications to obtain a plurality of video streams associated with the plurality of applications. Furthermore, the audio stream accessing module 240 accesses one or more input/output buffers associated with each of the plurality of applications to obtain a plurality of audio streams being played out by the plurality of applications. Moreover, the window host control module 206 controls the windows associated with the one or more audio and/or video streams of the plurality of audio and/or video streams of the current host and the incoming audio and/or video streams. In addition, the window client control module 208 enables the remaining MCCTs designated as the clients to control the windows of the one or more audio and/or video streams and the incoming audio and/or video streams sent by the current host. In this context, the window client control module 208 enables each of the remaining MCCTs designated as the clients to locally control the windows of the audio and/or video streams and incoming audio and/or video streams sent by the current host. For example, controlling the windows include control over the number of windows, layout of the windows, size of each window and the like. This is explained in more detail with reference to FIG. 3.

In another embodiment, the WMM 114 allows the remaining MCCTs designated as the clients to control the windows on the current host. Exemplary control of the windows on the current host includes touch event transfer from the remaining MCCTs designated as the clients or control of window size, position and the like. In this case, the window host control module 206 captures user events such as touch events before translating/transferring it to the current host or remaining MCCTs designated as the clients. In one example embodiment, the current host streams its entire display to the remaining MCCTs designated as the clients so that the remaining MCCTs designated as the clients can see a complete screen of the current host, control the actions on the screen completely, and effectively control the application(s) running on the current host from the remaining MCCTs designated as the clients.

Further in this embodiment, the MCAVBM 116 enables audio and/or video bridging, on the current host, of the one or more audio and/or video streams originated from the current host along with incoming audio and/or video streams from other end points designated as clients, such as the remaining MCCTs designated as the clients, one or more VCTs, one or more VoCTs, one or more AMGs, and/or one or more remote servers via an communication network (e.g., the remaining MCCTs of the one or more MCCTs 106, the VCTs 102, the VoCTs 104, the one or more AMGs 112, /or the remote servers 108, and the communication network 110 of FIG. 1), to achieve end point and digital content real-time shared experience for collaboration amongst two or more participants. For example, the one or more audio and/or video streams are obtained by converting digital content, such as animation, video, image, text, graphics, audio and the like originated from the current host.

In one example embodiment, one or more of the remote servers enable deployment of audio and/or video bridging of the current host with the remaining MCCTs designated as the clients, the VCTs, the VoCTs, remote streaming clients (e.g., the remote streaming clients 122 of FIG. 1) and/or the AMGs. In this example embodiment, the one or more of the remote servers enable deployment of the audio and/or video bridging of the remaining MCCTs designated as the clients, the VCTs, the VoCTs, the remote streaming clients and/or the AMGs by registration and maintaining a database of the remaining MCCTs designated as the clients, the VCTs, the VoCTs, the remote streaming clients and/or the AMGs. For example, the remote server includes a session initiation protocol (SIP) server and the like. In a typical audio and/or video conferencing scenario, where there exists the remote server to facilitate the deployment of the end points designated as clients. The remote server's primary functionality is to enable registration and identification of each of the end points designated as the clients. The remote server can in addition have a back-end database to maintain the individual user profiles and map them to registered elements in the network. The remote server also enables connectivity of the clients by enabling network address translation (NAT) traversal by using one of different methods, such as simple traversal of user datagram protocol (UDP) through NAT, or more commonly known as STUN, media relay, traversal using relay NAT (TURN), etc., in conjunction with appropriate blocks on the end points designated as the clients. In one embodiment, the remote server is a SIP registrar performing the above mentioned functionalities. In another embodiment, one or more of the remote servers are used to store content that can be shared with multiple end points.

In one exemplary embodiment, the ARM 210 enables the current host to receive multiple audio streams in different formats from the remaining MCCTs designated as the clients, the VCTs, the VoCTs, the AMGs and/or the remote servers and de-jitter each audio stream independently. Further, the ADM 212 decodes fully or partially each de-jittered audio stream. Furthermore, the VRM 220 enables the current host to receive multiple video streams in different formats and resolutions, from the remaining MCCTs designated as the clients, the VCTs, the VoCTs, the one or more AMGs and/or the remote servers and de-jitter each video stream independently, if required. In addition, the VDM 222 enables decoding fully or partially each de-jittered video stream. Moreover, the AREM 236 and VREM 238 render the audio streams and video streams, respectively, on the current host.

Also, the AVSM 224 synchronizes each of the decoded audio and/or video streams of each participant connected to the current host before local play out. The AVSM 224 further synchronizes the audio and/or video streams before encoding and streaming out to each of the remaining MCCTs designated as the clients, VCTs, remote servers, remote streaming clients and/or VoCTs. In one example, the AVSM 224 works across all the other sub-components of the MCAVBM 116 to track and re-timestamp the audio and/or video streams as required, in order to achieve audio and/or video synchronization of the transmitted audio and/or video streams.

Further in this exemplary embodiment, the APMM 214 post processes the audio stream coming from each of the remaining MCCTs designated as the clients, VCTs, AMGs or VoCTs before playback and/or re-encoding. Exemplary post-processing includes mixing the incoming audio streams based on a weighted averaging for adjusting the loudness of the audio stream coming from each of the remaining MCCTs designated as the clients, VCTs, AMGs or VoCTs. Furthermore, the APMM 214 produces a separate audio stream specific to each of the remaining MCCTs designated as the clients, VCTs, AMGs, or VoCTs by removing an audio stream originating from a selected set of the remaining MCCTs designated as the clients, VCTs, AMGs or VoCTs and mixing the audio streams coming from one or more other remaining MCCTs designated as the clients, VCTs, AMGs and/or VoCTs. For example, the set of the remaining MCCTs designated as the clients, VCTs, AMGs or VoCTs is selected based on user configuration. In one example, the user selects a sub-set of the remaining MCCTs designated as the clients, the VCTs, AMGs or the VoCTs to group them in a conference.

In addition, the VPCM 230 processes and composes the RAW video streams received from the VDM 222 OR VAM 228. For example, processing the decoded video streams includes resizing the video streams. In one example, the VPCM 230 composes the RAW video streams selectively to each of the remaining MCCTs designated as the clients, VCTs, VoCTs and AMGs based on a user defined criteria. This is explained in more detail with reference to FIG. 5. For example, composing the RAW video streams includes selectively tiling the video streams. In one embodiment, the VPCM 230 composes the stream selectively for each end point with the user defined criteria such as a subset of end points as a 'group'.

The VPCM 230 further composes one or more RAW streams from the VAM 228 and/or RAW video streams from the VDM 222 selectively to each of the remaining MCCTs designated as the clients, VCTs, VoCTs, and AMGs by combining one or more of the decoded video streams along with region information. For example, the region information includes a number of windows and/or resolution. In one embodiment, on the current host, each application's output buffer or a displayable element can be encoded as a separate stream with its own codec format, resolution, frame rate, bit rate and the like. Further in this embodiment, multiple of such output buffers or displayable elements could be combined to form a single stream with its own codec format, resolution, frame rate and bit rate and like. Furthermore, each of such buffers can be encoded along with the region information and sent to the remaining MCCTs designated as the clients. For example, the current host is capable of carrying out collaboration on end points, with or without asymmetric audio and/or video streams based on the processing capability of the current host. The term "asymmetric audio and/or video streams" refers to the audio and/or video streams coming from each end point being different from each other in format, frame rate, resolution, bit rate and the like as well as the audio and/or video streams going to each of the end points being different from each other in format, frame rate, resolution, bit rate, composition and the like as well as audio and/or video streams either coming into the end point only (receive only without any transmit) or audio and/or video streams going out of the end point only (transmit only without any receive).

In one embodiment, the VPCM 230 performs a differential frame rate composition of different windows within a larger 'tiled' window. For example, the VPCM 230 combines one video at 15 fps (repeating every alternate frame) while the other video is at 30 fps. Effectively, the composed signal is at 30 fps, but the region that is composed at 15 fps is encoded using lesser number of bits as every alternate frame is identical to the previous frame, thus reducing the overall bit rate without needing any explicit selective coding in the encoder OR needing any selective coding of regions as separate streams. Further, the remaining MCCTs designated as the clients have the flexibility to display different audio and/or video streams coming to them in a position and size as defined by the user OR an external program. Particularly, the remaining MCCTs designated as the clients further have flexibility to be able to extract the region from the audio and/or video stream which has the region information to display the region in the position and size as configured by the user or an external program. This is explained in more detail with reference to FIG. 9.

Moreover, the AEM 216 encodes each of the audio streams coming from the APMM 214, separately, in a format required by each of the associated remaining MCCTs designated as the clients, VCTs, AMGs and VoCTs. Also, the ASM 218 receives each of the audio streams from the AEM 216 and sends the encoded audio streams to each of the associated remaining MCCTs designated as the clients, VCTs, AMGs and VoCTs. In one embodiment, the ASM 218 sends a selected set of audio streams to one or more of the remote servers, and the remote streaming clients on the communication network.

Furthermore, the VEM 232 encodes each of the composed video streams coming from the VPCM 230 in a format and resolution supported by each of the associated remaining MCCTs designated as the clients and VCTs. In one embodiment, the VEM 232 may encode only one stream that will be sent to all the remaining MCCTs, VCTs, VoCTs, AMGs, remote streaming clients and remote servers. In addition, the VSM 234 receives each of the encoded video streams from the VEM 232 and sends them to the associated remaining MCCTs designated as the clients, VCTs, VoCTs, AMGs, remote streaming clients, remote servers via the communication network. For example, the remote streaming clients primarily receive the content from the current host to enable users to view them (like personal computers on the network). The VSM 234 further sends encoded video streams to one or more of the remote servers, via the communication network, for broadcasting, real-time view by authorized people, storing for archival, non real-time play-out by the authorized people, re-distributing to the end points in the network and the like.

In an exemplary embodiment, the processing modules such as AEM 216, VEM 232, ADM 212, VDM 222 and the like can be accelerated outside the current host, on which the collaboration functionality is implemented, using a co-processing unit. For example, the acceleration is done by sending the RAW signals over a peripheral interface, such as a universal serial bus (USB) interface which then gets processed and is returned back in a compressed format as required over the same or another peripheral interface. In one example, the signal sent over to the co-processing is compressed in a format, such as joint photographic experts group (JPEG) and the like that is of low complexity and is implemented on the end point and the co-processing unit further de-compresses and re-compresses in a more complex format, such as H.264 or high efficiency video coding (HEVC).

Moreover, the AAM 226 acquires for acquiring one or more channels of the audio streams from the current host. In one embodiment, the AAM 226 acquires uncompressed (RAW) audio of the local participant from the audio capture as well as the decompressed (RAW) audio frames coming from the audio stream accessing module 240, which are being played out by an application on the current host. The AAM 226 then delivers these one or more channels of uncompressed audio to the APMM 214. In one exemplary embodiment, the AAM 226 even acquire a compressed audio stream and deliver it directly to the ASM 218 for packetization and streaming out, bypassing the APMM 214 and AEM 216.

Also, the VAM 228 acquires the one or more video streams from the current host. In one embodiment, the VAM 228 acquires uncompressed (RAW) video of the local participant from a camera capture as well as one or more decompressed (RAW) video frames coming from the window accessing module 204, which are being rendered and/or generated by one or more applications running on the current host from the local storage of the current host or coming from the remote server. The VAM 228 then delivers the one or more RAW video streams to the VPCM 230 which then uses this as one of the decoded or RAW streams for composition. In another embodiment, the VAM 228 may acquire the input buffers to an application in a RAW format. In yet another embodiment, the VAM 228 captures just one RAW video stream.

In one exemplary implementation, the VAM 228 captures the entire display area or selected sections of the display area or selected output windows of selected applications running on the current host or buffers of the display area or output or input buffers of the application running on the current host in the background. In one exemplary embodiment, the VAM 228 even acquire a compressed video stream and deliver it directly to the VSM 234 for packetization and streaming out, bypassing the VPCM 230 and VEM 232. In one example, where the VAM 228 acquires different buffers as separate video signals, the VPCM 230 can be used to compose the viewing layout to each of the remaining MCCTs designated as the clients, VCTs, VoCTs, and AMGs that are in communication with the current host to be different from the viewing layout on the local display of the current host itself. Whereas, in the embodiment, where only one RAW stream of uncompressed signal of the video on the current host is captured, the viewing layout of the remaining MCCTs designated as the clients, VCTs, VoCTs, and AMGs that are in communication with the current host may be the same as the viewing layout on the local display of the current host itself.

Further, the AREM 236 is responsible for rendering the audio on the local end point (host or client) via various audio play out interfaces, such as a speaker, a headset, a high-definition multimedia interface (HDMI), and the like. In one exemplary implementation, the VREM 238 is responsible for rendering the video on the local end point (host or client) via various video rendering interfaces such as a liquid crystal display (LCD), a HDMI, and the like.

In one embodiment, the current host can also be configured to send out the compressed audio and/or video streams to the remote streaming clients to perform decode and render only functionality. In another embodiment, the current host can be configured to send out the compressed audio and/or video streams to the one or more of the remote servers for re-distribution, recording and the like.

Figure 3:
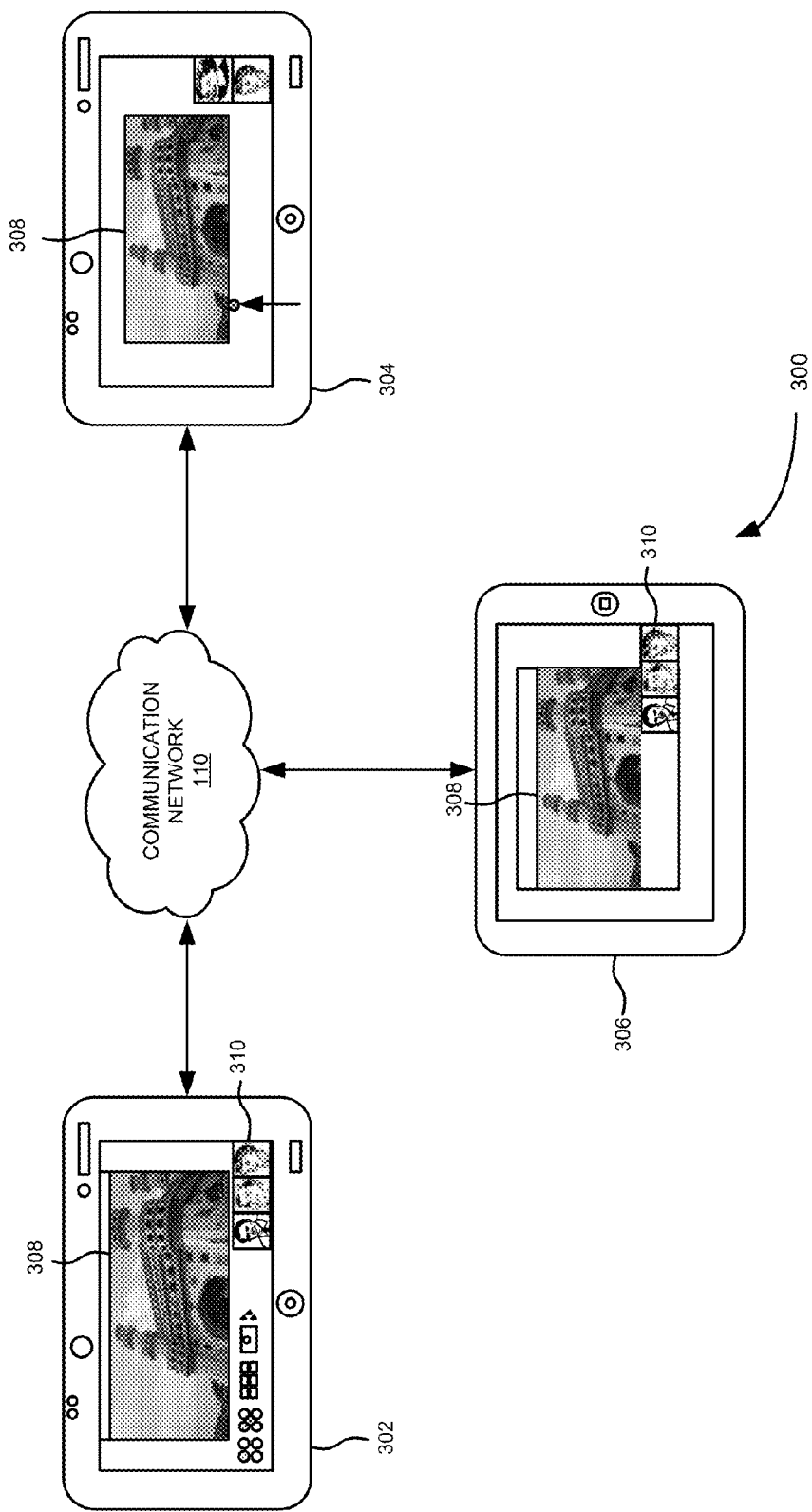
FIG. 3 is a block diagram illustrating a MCCT, designated as a client, with local control over a number of windows, layout of the windows and size of each window of application(s) during the end point and digital content centric collaboration across the end points, according to one embodiment.

Referring now to FIG. 3, which is a block diagram 300 that illustrates a MCCT 304 designated as a client with local control over a number of windows, layout of the windows and size of each window of the application(s) during the end point and digital content centric collaboration across the end points, according to one embodiment. As shown in the FIG. 3, the block diagram includes a MCCT 302 designated as a current host and the MCCT 304 and an end point 306 designated as clients. For example, the end point 306 includes one of the VCTs, VoCTs and AMGs embedded with the VCTs.

In one embodiment, the MCCT 302 is communicatively connected to the MCCT 304 and the end point 306 via the communication network 110. Further, the MCCT 302 enables audio and/or video bridging of an audio and/or video stream 308 of its stored or captured digital content and/or application(s) and incoming audio and/or video streams 310 from the MCCT 304 and end point 306 to achieve end point and digital content centric real-time shared experience for collaboration across the end points. Particularly, the MCCT 302 enables streaming of the audio and/or video stream 308 and incoming audio and/or video streams 310 to the end point 306 by controlling the windows of the audio and/or video stream 308 and incoming audio and/or video streams 310 during the end point and digital content centric collaboration. The MCCT 302 also enables streaming of the audio and/or video stream 308 and incoming audio and/or video streams to the MCCT 304 by enabling it to locally control the windows of the audio and/or video stream 308 and incoming audio and/or video streams during the end point and digital content centric collaboration. For example, controlling the windows include control over the number of windows, layout of the windows, size of each window and the like. In one example, the MCCT 304 has the flexibility to display different audio and/or video streams coming to it in the position and size as defined by the user OR an external program.

Figure 4:
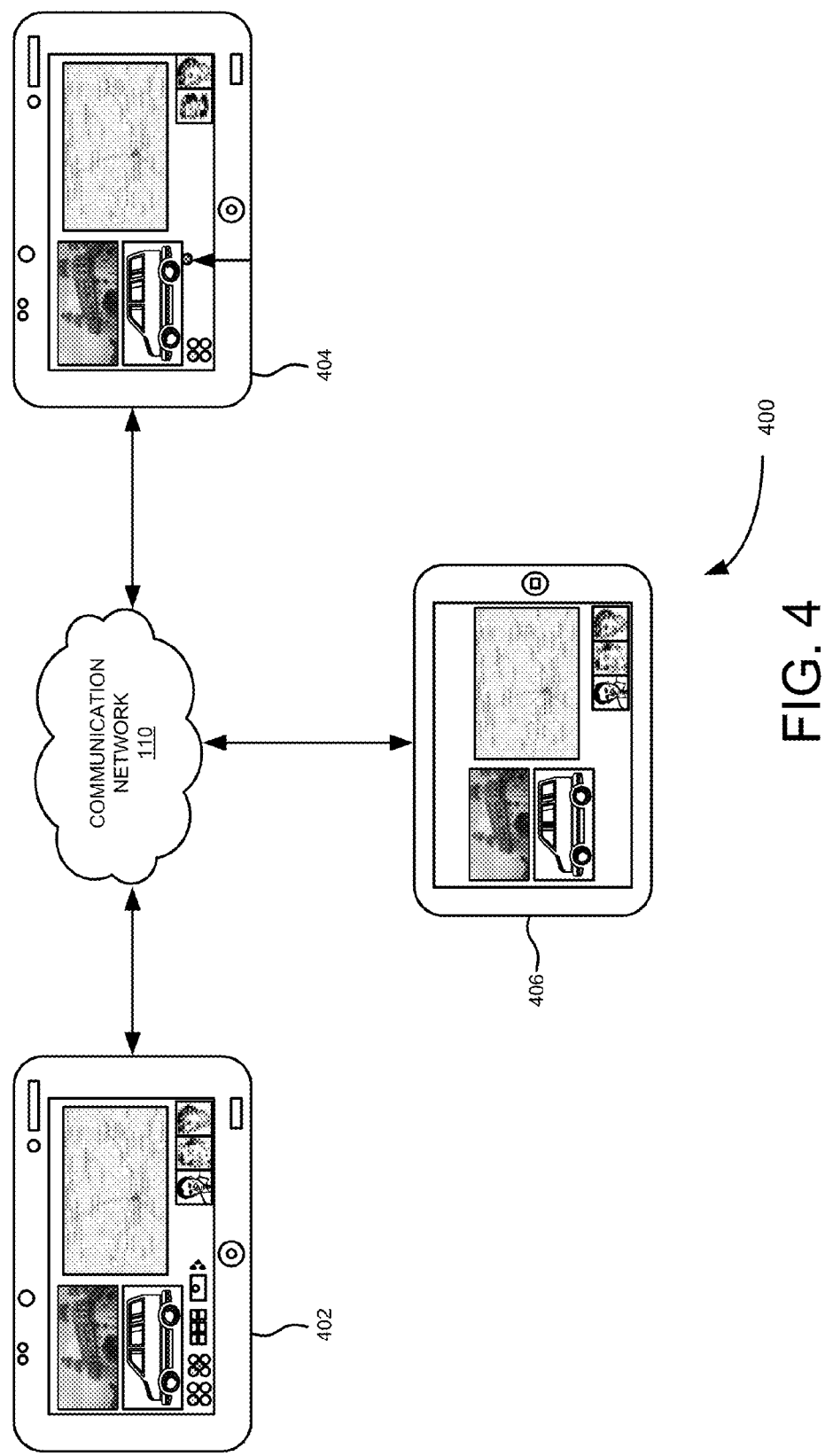
FIG. 4 is a block diagram illustrating audio and/or video bridging, on MCCT designated as a host, of multiple audio and/or video streams of its stored or captured digital content and/or application(s) and incoming audio and/or video streams from a MCCT and an end point designated as clients, according to one embodiment.

Referring now to FIG. 4, which is a block diagram 400 that illustrates audio and/or video bridging, on a MCCT 402 designated as a current host, of multiple audio and/or video streams of its stored or captured digital content and/or application(s) and incoming audio and/or video streams from a MCCT 404 and an end point 406 designated as clients, according to one embodiment. As shown in the FIG. 4, the block diagram 400 includes the MCCT 402, the MCCT 404, and the end point 406. For example, the end point 406 includes one of the VCTs, VoCTs and AMGs embedded with the VCTs. In one embodiment, the MCCT 402 is communicatively connected to the MCCT 404 and the end point 406 via the communication network 110. Further, the MCCT 402 enables audio and/or video bridging of the multiple audio and/or video streams of its stored or captured digital content and/or application(s) of the MCCT 402 and the incoming audio and/or video streams from the MCCT 404 and end point 406, via the communication network 110.

Figure 5:
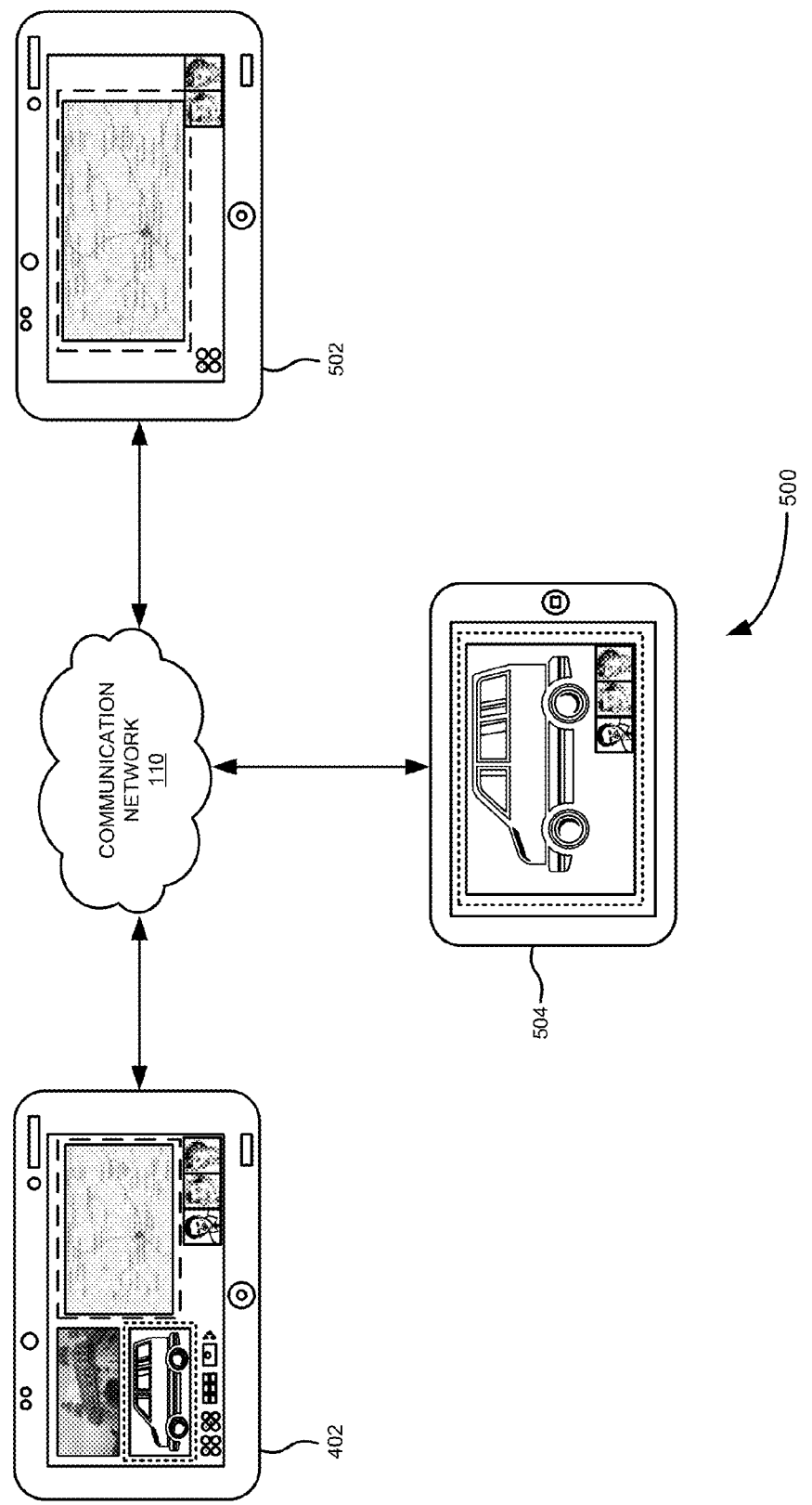
FIG. 5 is a block diagram illustrating distributed collaboration with each end point, designated as a client, receiving and/or displaying different audio and/or video streams relevant to the role of its user in the ongoing collaboration in the end point and digital content centric collaboration across the end points, according to one embodiment.

Referring now to FIG. 5, which is a block diagram 500 that illustrates distributed collaboration with each of a MCCT 502 and an end point 504, designated as clients, receiving and/or displaying different audio and/or video streams relevant to the role of its user in the ongoing collaboration in the end point and digital content centric collaboration across the end points, according to one embodiment. For example, the end point 504 includes one of the VCTs, VoCTs and AMGs embedded with the VCTs. As shown in FIG. 5, the MCCT 402, designated as the current host, selectively sends different audio and/or video streams of its stored or captured digital content and/or application(s) relevant to the role of its user in the ongoing collaboration to the MCCT 502 and the end point 504 during the end point and digital content centric collaboration across the end points. In one embodiment, the MCCT 402 sends the same audio and/or video stream, with region information, based on which the MCCT 502 and the end point 504 display only the information that is relevant as per their region settings. For example, the MCCT 402 sends only one stream consisting of all the content being displayed on the MCCT 402, but mark out only the relevant regions that gets displayed on each of the according to the information carried in the stream or by any out of band means.

Figure 6:
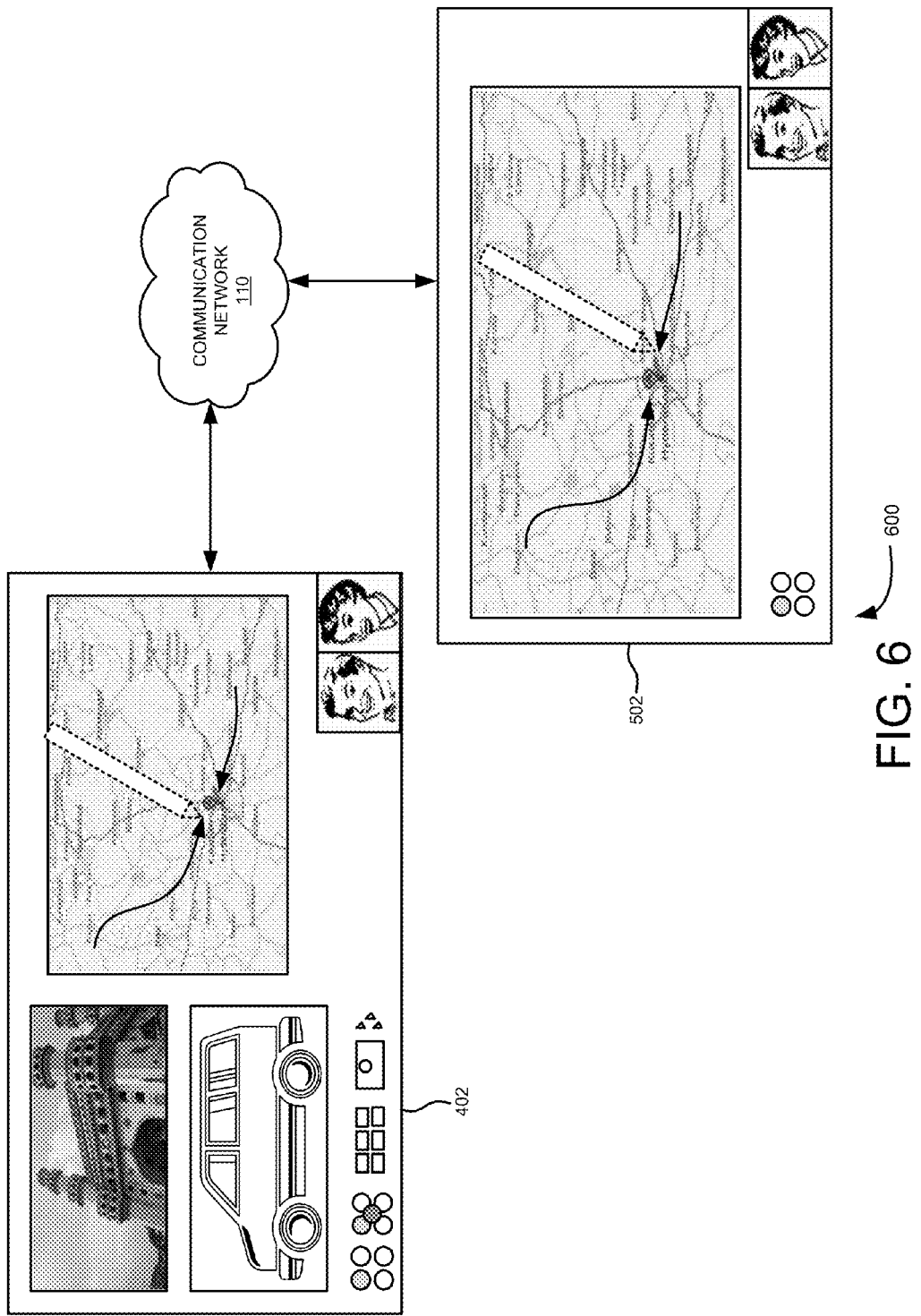
FIG. 6 is a block diagram illustrating collaborative interaction through simultaneous operation on same content of a MCCT designated as a host on a MCCT designated as a client during the end point and digital content centric collaboration, according to one embodiment.

Referring now to FIG. 6, which is a block diagram 600 that illustrates collaborative interaction through simultaneous operation on same content of the MCCT 402 designated as the current host on MCCT 502 designated as the client during the end point and digital content centric collaboration, according to one embodiment. As shown in FIG. 6, the MCCT 402 selectively sends the audio and/or video streams of its stored or captured digital content and/or application(s) to the MCCT 502 via the communication network 110 and the MCCT 402 and the MCCT 502 performs simultaneous operation on the same content during the end point and digital content centric collaboration.

Figure 7:
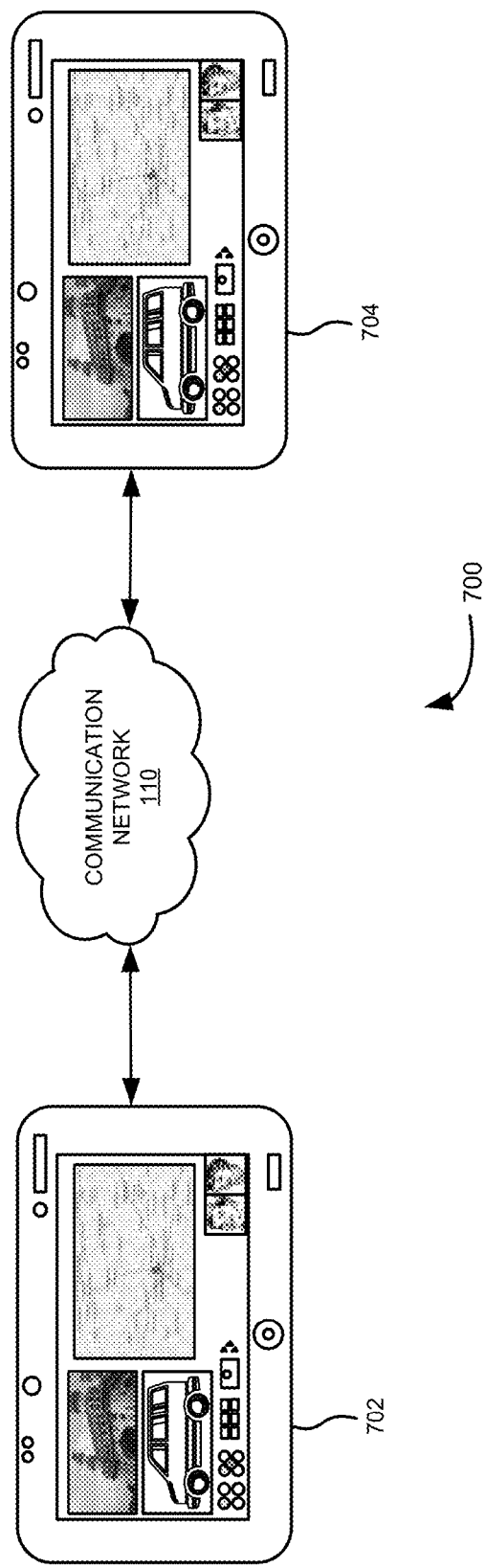
FIG. 7 is block diagram illustrating handover of control of collaboration from a MCCT, designated as a host to a MCCT designated as a client during the end point and digital content centric collaboration, according to one embodiment.

Referring now to FIG. 7, which is a block diagram 700 illustrating handover of control of collaboration from a MCCT 702, designated as a current host, to a MCCT 704, designated as a client, during the end point and digital content centric collaboration, according to one embodiment. As shown in FIG. 7, the MCCT 702 streams its entire display to the MCCT 704 so that the MCCT 704 can see the complete screen of the MCCT 702 and also control the actions on the screen completely, effectively controlling the application(s) running on the MCCT 702 from the MCCT 704.

Figure 8:
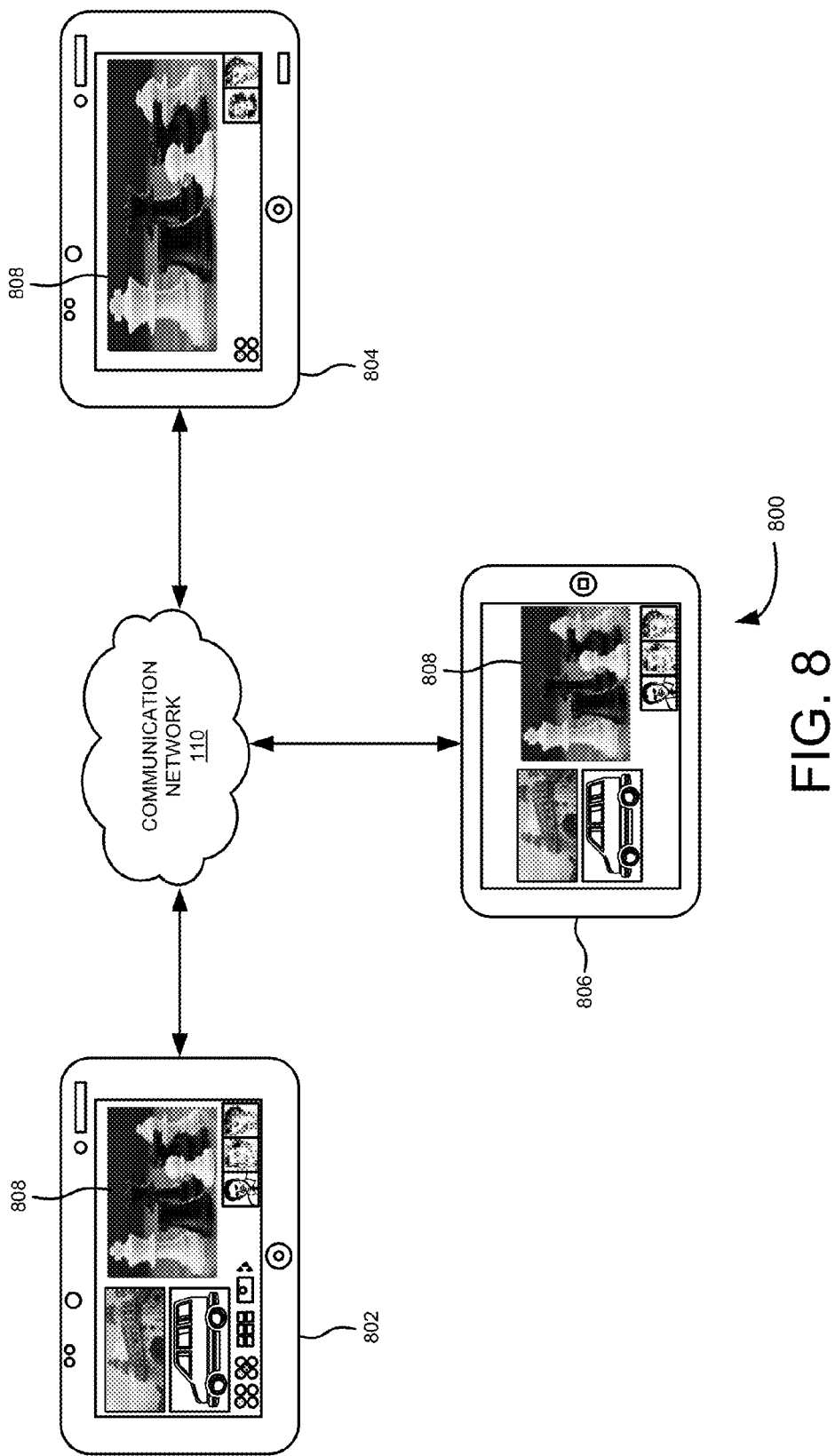
FIG. 8 is a block diagram illustrating temporary audio/visual content lending by converting an application into the audio/visual content and transmitting or mirroring between the MCCTs, during the end point and digital content centric collaboration, according to one embodiment.

Referring now to FIG. 8, which is a block diagram 800 illustrating temporary audio and/or visual content 808 lending by converting the application into the audio/visual content 808 and transmitting or mirroring between a MCCT 804, designated as a client, and a MCCT 802, designated as a current host, during the end point and digital content centric collaboration, according to one embodiment. As shown in FIG. 8, during the end point and digital content centric collaboration, the MCCT 802 requests the MCCT 804 to send the application which is not there in the MCCT 802. Further, the MCCT 804 temporarily lends the audio and/or visual content 808 by converting the application into the audio and/or visual content 808 and transmitting the audio and/or visual content 808 to the MCCT 802 as well as giving complete control over the screen area of that particular application so that the MCCT 802 can use the application as if it were running on the MCCT 802 and perform all the controls necessary on the application. The MCCT 802 further streams the audio/visual content 808 along with the audio and/or video streams of the MCCT 802 to an end point 806, designated as a client, during the end point and digital content centric collaboration.

Figure 9:
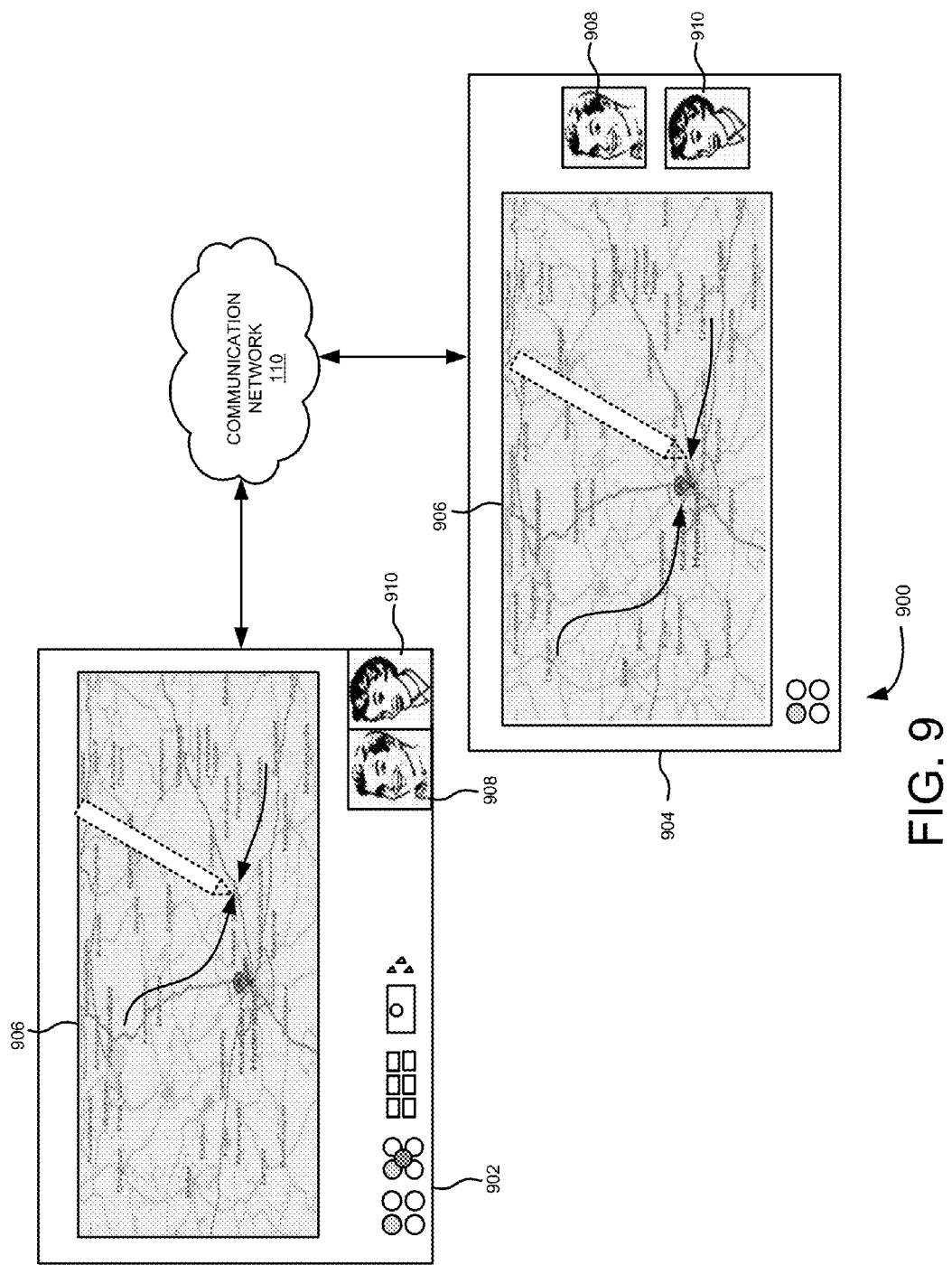
FIG. 9 is a block diagram illustrating streaming of one or more audio and/or video streams by a MCCT designated as a host to a MCCT designated as a client during the end point and digital content centric collaboration, according to one embodiment.

Referring now to FIG. 9, which is a block diagram 900 illustrating streaming of one or more audio and/or video streams by a MCCT 902, designated as a current host, to a MCCT 904, designated as a client, during the end point and digital content centric collaboration, according to one embodiment. As shown in FIG. 9, the MCCT 902 sends each of output buffers (or displayable elements) 906, 908, 910 as separate encoded audio and/or video streams or 906 as a separate stream and 908 and 910 combined as a separate stream or 906, 908 and 910 as one combined stream to the MCCT 904 along with region information. Further, the MCCT 904 have the flexibility to decode audio and/or video streams separately and extracts the regions that are part of a single audio and/or video stream and render it separately with the flexibility that the user (or a program) wants.

Figure 10:
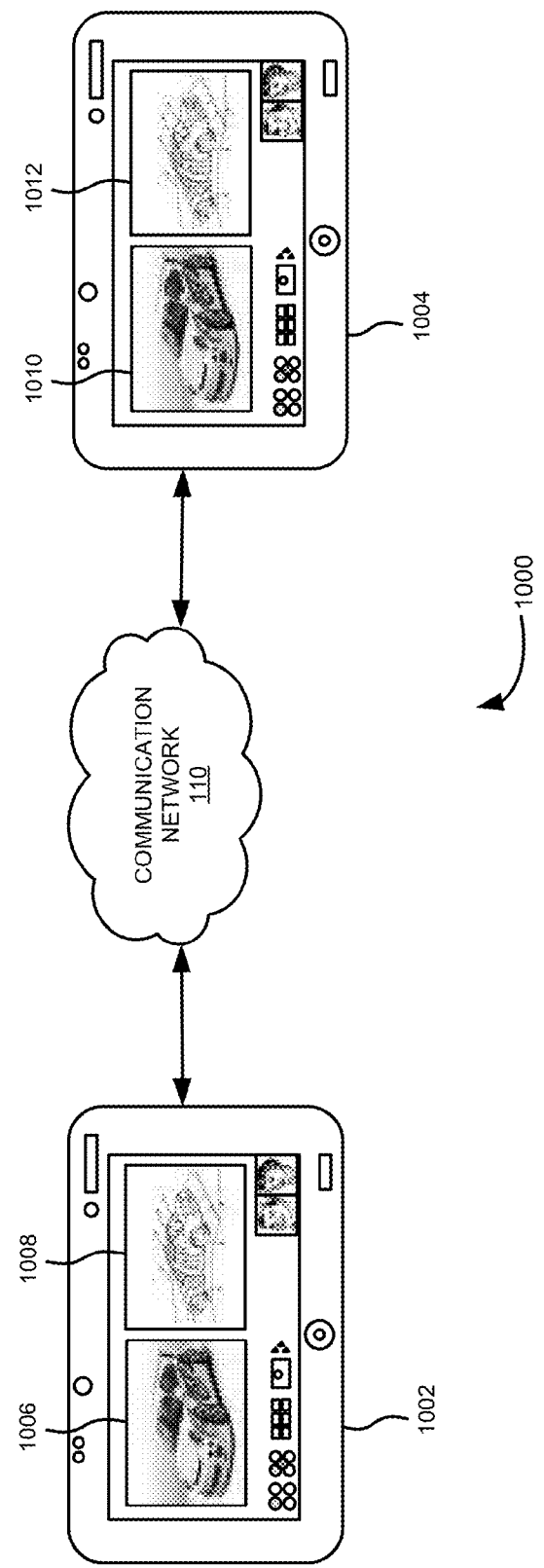
FIG. 10 is a block diagram illustrating a close integration of an example application using application programming interfaces (APIs) provided by the MCCTs, according to one embodiment.

Referring now to FIG. 10, which is a block diagram 1000 illustrating a close integration of an example application using APIs provided by a MCCT 1002 designated as a current host and a MCCT 1004 designated as a client. In this embodiment, a gaming application is taken as an example, where the application is a multi-party gaming application. As shown in the FIG. 10, a game is programmed such a way that the game runs on both the MCCT 1002 and the MCCT 1004 in a split-window mode. The local game runs on the left hand half (e.g., a window 1006) of the MCCT 1002 to ensure the fastest response for the user on the MCCT 1002, while the video of the game running on the MCCT 1002 is transmitted to the MCCT 1004 and displayed on the left hand half of the MCCT 1004 (e.g., a window 1010). The game running on the MCCT 1004 runs on the right hand half of the MCCT 1004 (e.g., a window 1012), giving the best response to the user, while the video of the game from the MCCT 1004 is transmitted to the MCCT 1002 and displayed on the right hand half of the MCCT 1002 (e.g., a window 1008). Effectively, both the users (players in this case) get to see the other party side-by-side. However, the latency of their own game window (which requires quick response times from the user) is much shorter as it is locally run and displayed while the game window of their partner is a bit delayed as it is the processed (captured, encoded, transmitted, received, decoded and displayed) version. This gives an effect of a multi-party game, without compromising on the response times needed for games. In another example embodiment, even the control of the games can be transferred using the APIs provided by the MCCT host and client.

Figure 11:
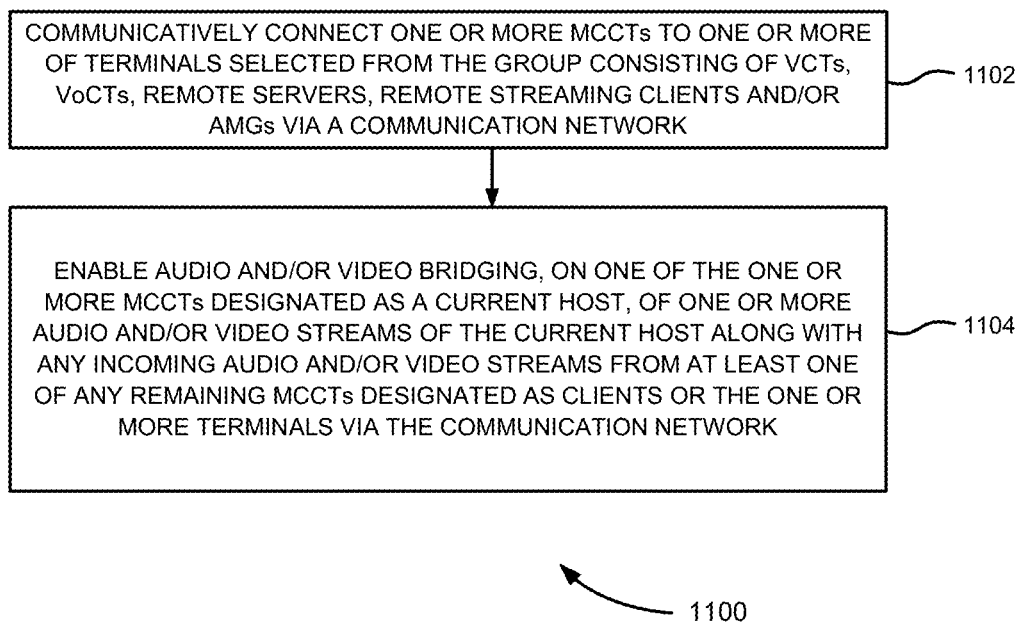
FIG. 11 illustrates a process flow for the end point and digital content centric collaboration across the end points that are capable of Internet protocol (IP) video communication, according to one embodiment.

Referring now to FIG. 11, which is a process flow 1100 for the end point and digital content centric collaboration across end points that are capable of IP video communication, according to one embodiment. At block 1102, one or more MCCTs are communicatively connected to one or more terminals selected from the group consisting of VCTs, VoCTs, remote servers, remote streaming clients and/or AMGs embedded with the VCTs or MCCTs via a communication network. At block 1104, audio and/or video bridging of one or more audio and/or video streams originating from one of the MCCTs designated as a current host along with any incoming audio and/or video streams from at least one of any remaining MCCTs designated as clients or the one or more terminals is enabled on the current host, via the communication network. In one embodiment, audio and/or video bridging of the one or more audio and/or video streams originating from the current host along with any incoming audio and/or video streams from at least two or more of any remaining MCCTs designated as the clients or the terminals is enabled on the current host, via the communication network. In one exemplary embodiment, the audio and/or video bridging is enabled by the current host with the at least one of any remaining MCCTs designated as the clients or the one or more terminals via one or more of the remote servers maintaining user profiles. In one example, the one or more audio and/or video streams are obtained by converting digital content originating from the current host. For example, the digital content includes animation, audio, video, image, graphics, text and the like.

In one embodiment, each of the MCCTs includes a WMM, a MCAVBM, an API for application developers and an API for ISPs, enterprise customers or any centralized controller. In one exemplary embodiment, the WMM creates and assigns windows to a plurality of applications running on the MCCT, designated as the current host, accesses input/output (I/O) buffer(s) of the applications and controls the windows. In one example, the WMM includes a window creation module for creating and assigning a window to each of a plurality of applications running on the current host. The WMM further includes a window accessing module for accessing one or more input/output buffers associated with each of the plurality of applications to obtain a plurality of video streams associated with the plurality of applications. The WMM further includes an audio stream accessing module for accessing one or more input/output buffers associated with each of the plurality of applications to obtain a plurality of audio streams being played out by the plurality of applications. The WMM further includes a window host control module for controlling the windows associated with the one or more audio and/or video streams of the plurality of audio and/or video streams of the current host and the incoming audio and/or video streams. The WMM further includes a window client control module for enabling each of the MCCTs to control the windows of the audio and/or video streams and the incoming audio and/or video streams received by the one or more MCCTs. For example, the current host streams its entire display to the remaining MCCTs designated as the clients so that the remaining MCCTs designated as the clients can see the complete screen of the current host and one of the remaining MCCTs designated as the clients controls the actions on the screen completely and effectively control the application(s) running on the current host.

Further in this exemplary embodiment, the MCAVBM enables the audio and/or video bridging of the one or more audio and/or video streams originating from the current host along with the one or more incoming audio and/or video streams from the at least one of any remaining MCCTs designated as the clients or the one or more terminals, via the communication network. In one example, the MCAVBM includes an ARM for enabling the current host to receive multiple audio streams and de-jitter each audio stream independently. The MCAVBM further includes an ADM for decoding fully or partially each de-jittered audio stream. The MCAVBM further includes an AREM to render the audio streams on the current host.

Further in this example, the MCAVBM includes a VRM for enabling the current host to receive multiple video streams and de-jitter each video stream independently. The MCAVBM further includes a VDM for decoding fully or partially each de-jittered video stream. The MCAVBM further includes VREM to render the video streams on the current host. The MCAVBM further includes an AVSM for synchronizing the decoded audio and corresponding video streams of corresponding terminals connected to the current host before local play out and for synchronizing the audio and/or video streams before encoding and streaming out to the remaining MCCTs designated as the clients and the one or more terminals.

Furthermore in this example, the MCAVBM includes an APMM for post processing the audio streams coming from the at least one of the remaining MCCTs designated as the clients or the one or more terminals before playback and/or re-encoding. The APMM further produces a separate audio stream specific to each of the remaining MCCTs designated as the clients and the one or more terminals by removing an audio stream originating from a selected set of the remaining MCCTs designated as the clients and the one or more terminals and mixing the audio streams coming from one or more other remaining MCCTs designated as the clients, VCTs and/or VoCTs. For example, the set of the remaining MCCTs designated as the clients and the one or more terminals is selected based on user configuration.

In addition, the MCAVBM includes a VPCM for processing and composing the decoded video streams received from the VDM. For example, processing the decoded video streams includes resizing the video streams. The VPCM further composes the decoded video streams selectively to each of the remaining MCCTs designated as the clients and the one or more terminals based on a user defined criteria. For example, composing the decoded video streams includes selectively tiling the video streams. The VPCM further composes decoded video streams selectively to each of the remaining MCCTs designated as the clients and the one or more terminals by combining output buffers of one or more of a plurality of applications along with region information and the VPCM further performs a differential frame rate composition of different windows of the plurality of applications within a larger 'tiled' window.

Moreover, the MCAVBM includes an AEM for encoding each of the audio streams coming from the APMM, separately, in a format required by each of the associated remaining MCCTs designated as the clients and the one or more terminals. The MCAVBM further includes an ASM for receiving each of the audio streams from the AEM and sending the encoded audio streams to each of the associated remaining MCCTs designated as the clients and the one or more terminals. The ASM further sends a selected set of audio streams to the remote server via the communication network. The MCAVBM further includes a VEM for encoding each of the composed video streams coming from the VPCM in a format supported by each of the associated remaining MCCTs designated as the clients and the one or more terminals. The MCAVBM further includes a VSM for receiving each of the encoded video streams from the VEM and sending them to the associated remaining MCCTs designated as the clients and the one or more terminals via the communication network and wherein the VSM further sends encoded video streams to the remote servers, via the communication network, for broadcasting, real-time view by authorized people, storing for archival and/or non real-time play-out by the authorized people. The MCAVBM further includes an AAM for acquiring the one or more audio streams from the current host. The MCAVBM further includes a VAM for acquiring the one or more video streams from the current host. The details of the operation of end point and digital content centric real-time shared experience for collaboration are explained in more detail with reference to FIGS. 1-10.

A platform for end point and digital content centric real-time shared experience for collaboration across end points having electronics capable of carrying out video communication and capture and/or store and/or receive and/or process audio-visual and/or graphical content. Collaboration capability of the above technique allows the user of an end point to share the captured/stored/received/processed media content in real-time with other users at different locations around the world having IP VCTs or end points and substantially simultaneously converse with each other having a shared real-time experience similar to the experience of all the users being at the same location, without requiring any external hardware and/or service to enable the same. For example, the user of the PC capable tablet can watch a movie on his tablet and simultaneously share it with his friends at different locations who can watch it together on their IP video communication capable tablets/mobile/TV and the like and at the same time converse with each other, just like they would do if they were sitting next to each other. The 'connection' of users for collaboration will use a combination of 'private connection' like user phone book OR 'public, searchable connection' like Linkedin OR Face book. The choice will be user configurable for complete or subset of users.

For example, the user of the PC capable tablet who is operating on a document can simultaneously share it with his colleagues at different locations who can also operate it simultaneously on their IP video communication capable tablets/mobile/TV and the like and at the same time converse with each other, just like they would do if they were sitting next to each other. For example, a teacher can conduct lessons to students across geography. In one example, a real-time online examination can be conducted across geography. Doctors can collaborate on a medical procedure or practice across geography. Amateur or professionals performing to an interactive audience across geography. A geographically distant artist performing together to virtually create a single event across geography and real-time reporting with interactive audience across geography.

In another example, a user while taking vacation snaps on his PC capable camera can simultaneously share it with their friends or family members at different locations who can watch it together on their IP video communication capable mobiles, tablets and/or personal computers and the like and see each other and converse on the shared pictures at the same time. In another example, a student while studying his electronic version of the text book on a PC capable e-book reader can simultaneously share it with his fellow students at different locations who can read it together on their IP video communication capable tablets or personal computers etc., and simultaneously discuss with each other about the subject, just like they would if they were next to each other. In one embodiment of deployment, where there could be more than one MCCT in the network, the above technique also provides a method to not only view, but also control the applications and screen of the other participants. For example, in one embodiment, two or more people having MCCTs with each other can view, collaborate and annotate on a picture or a map about a location to get a truly 'being together' experience. In another embodiment, the MCCT can provide appropriate application programmable interfaces (APIs) to enable users to write and/or install applications on MCCTs to have a tight integration of a shared experience. For example, users can write and/or install games made specifically for MCCT to transfer the signals between one or more participants having MCCTs to experience a multi-player game as if they are at the same location.

The above technique also enables the selective control of the MCCT via a centralized place on the deployment network. In an example embodiment, the features available for the end user OR the features available on the end point can be selectively enabled or disabled via a user key provided by the end point/user to the centralized server thus enabling control of enabling/disabling selective features on the end point. Also, as the content being shared remains on the end point and is not residing on any server, there is privacy of content by default. In another embodiment, the selective control of features as well as applications on the end device can be selectively enabled by the user of the end device. In an exemplary embodiment, the user can enable the control of either a select region OR only a select set of applications from either another user/end point in the deployed network OR from a centralized server in the deployed network. The user, using the above technique, can record the entire 'session' and store/broadcast it at any point in time.

In one embodiment, an article comprising a non-transitory computer readable storage medium having instructions thereon which when executed by a computing platform result in execution of the above mentioned method. The method described in the foregoing may be in a form of a machine-readable medium embodying a set of instructions that, when executed by a machine, causes the machine to perform any method disclosed herein. It will be appreciated that the various embodiments discussed herein may not be the same embodiment, and may be grouped into various other embodiments not explicitly disclosed herein.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method, comprising:
   communicatively connecting one or more media centric collaboration terminals (MCCTs) to one or more terminals selected from the group consisting of video communication terminals (VCTs), voice over Internet protocol (IP) communication terminals (VoCTs), remote servers, remote streaming clients and/or appliances, machines and gadgets (AMGs) via a communication network; and
   enabling audio and/or video bridging, on one of the one of more MCCTs designated as a current host, of one or more audio and/or video streams originating from the current host along with any incoming audio and/or video streams from at least one of any remaining MCCTs designated as clients or the one or more terminals, via the communication network, wherein each of the one or more MCCTs includes a window management module (WMM), the WMM includes a window creation module for creating and assigning a window to each of a plurality of applications running on the current host.

2. The method of claim of 1, wherein the one or more audio and/or video streams are obtained by converting digital content originating from the current host and wherein the digital content includes animation, audio, video, image, graphics and/or text.

3. The method of claim 1, wherein audio and/or video bridging is enabled by the current host with the at least one of any remaining MCCTs designated as the clients or the one or more terminals via one or more of the remote servers maintaining user profiles.

4. The method of claim 1, wherein each of the one or more MCCTs includes a media centric collaboration enabling audio and/or video bridging module (MCAVBM), an application programming interface (API) for application developers and an API for Internet service providers (ISPs), enterprise customers or any centralized controller.

5. The method of claim 1, wherein the WMM further includes a window accessing module for accessing one or more input/output buffers associated with each of the plurality of applications to obtain a plurality of video streams associated with the plurality of applications and wherein the WMM further includes an audio stream accessing module for accessing one or more input/output buffers associated with each of the plurality of applications to obtain a plurality of audio streams being played out by the plurality of applications.

6. The method of claim 1, wherein the WMM further includes a window host control module for controlling the windows associated with the one or more audio and/or video streams of the plurality of audio and/or video streams of the current host and the one or more incoming audio and/or video streams.

7. The method of claim 1, wherein the WMM further includes a window client control module for enabling the MCCTs to control the windows of the one or more audio and/or video streams and the one or more incoming audio and/or video streams received by the one or more MCCTs.

8. The method of claim 1, wherein the current host streams its entire display to the remaining MCCTs designated as the clients and one of those remaining MCCTs designated as the clients controls actions on the screen completely and effectively control the application(s) running on the current host.

9. The method of claim 4, wherein enabling audio and/or video bridging, on the current host, of the one or more audio and/or video streams originating from the current host along with the incoming audio and/or video streams from the at least one of any remaining MCCTs designated as the clients or the one or more terminals, via the communication network, comprises:
   enabling audio and/or video bridging, on the current host, of the one or more audio and/or video streams originating from the current host along with the incoming audio and/or video streams from the at least one of any remaining MCCTs designated as the clients or the one or more terminals, via the communication network, by the MCAVBM.

10. The method of claim 9, wherein the MCAVBM in the MCCTs designated as the clients enables multi-stream encoding, decoding and composition of the one or more audio and/or video streams for display as per user defined and/or predefined configuration settings.

11. The method of claim 9, wherein the one or more audio and/or video streams and the incoming audio and/or video streams are processed by a co-processing unit which is outside the current host.

12. The method of claim 9, wherein the MCAVBM includes an audio receive module (ARM) for enabling the current host to receive multiple audio streams and de-jitter each audio stream independently, wherein the MCAVBM further includes an audio decode module (ADM) for decoding fully or partially each de-jittered audio stream and wherein the MCAVBM further includes an audio render module (AREM) to render the audio streams on the current host.

13. The method of claim 12, wherein the MCAVBM further includes a video receive module (VRM) for enabling the current host to receive multiple video streams and de-jitter each video stream independently, wherein the MCAVBM further includes a video decode module (VDM) for decoding fully or partially each de-jittered video stream and wherein the MCAVBM further includes a video render module (VREM) to render the video streams on the current host.

14. The method of claim 13, wherein the MCAVBM further includes an audio and/or video synchronization module (AVSM) for synchronizing decoded audio and corresponding video streams of the corresponding terminal connected to the current host before local play out and wherein the AVSM further synchronizes the audio and/or video streams before encoding and streaming out to each of the remaining MCCTs designated as the clients and the one or more terminals.

15. The method of claim 4, wherein the MCAVBM further includes an audio processing and mixing module (APMM) for post processing the audio streams coming from the at least one of the remaining MCCTs designated as the clients or the one or more terminals before playback and/or re-encoding and wherein the APMM produces a separate audio stream specific to each of the remaining MCCTs designated as the clients and the one or more terminals by removing an audio stream originating from a selected set of the remaining MCCTs designated as the clients and the one or more terminals and mixing the audio streams coming from one or more other remaining MCCTs designated as the clients and the one or more terminals.

16. The method of claim 15, wherein the set of the remaining MCCTs designated as the clients and the one or more terminals is selected based on user configuration.

17. The method of claim 16, wherein the MCAVBM further includes a video processing and composing module (VPCM) for processing and composing the decoded video streams received from the VDM, wherein processing the decoded video streams includes resizing the video streams, wherein the VPCM composes the decoded video streams selectively to each of the remaining MCCTs designated as the clients and the one or more terminals based on a user defined criteria, wherein composing the decoded video streams includes selectively tiling the video streams, wherein the VPCM further composes decoded video streams selectively to each of the remaining MCCTs designated as the clients and the one or more terminals by combining output butlers of one or more of a plurality of applications along with region information and wherein the VPCM further performs a differential frame rate composition of different windows of the plurality of applications within a larger 'tiled' window.

18. The method of claim 17, wherein the MCAVBM further includes an audio encode module (AEM) for encoding each of the audio streams coming from the APMM, separately, in a format required by each of the associated remaining MCCTs designated as the clients and the one or more terminals, wherein the MCAVBM further includes an audio send module (ASM) for receiving each of the audio streams from the AEM and sending the encoded audio streams to each of the associated remaining MCCTs designated as the clients and the one or more terminals and wherein the ASM sends a selected set of audio streams to the remote servers via the communication network.

19. The method of claim 18, wherein the MCAVBM further includes a video encode module (VEM) for encoding each of the composed video streams coming from the VPCM in a format supported by each of the associated remaining MCCTs designated as the clients and the one or more terminals and wherein the MCAVBM further includes a video send module (VSM) for receiving each of the encoded video streams from the VEM and sending them to the associated remaining MCCTs designated as the clients and the one or more terminals via the communication network and wherein the VSM further sends encoded video streams to the remote servers, via the communication network, for broadcasting, re-distribution, real-time view by authorized people, storing for archival and/or non real-time play-out by the authorized people.

20. The method of claim 19, wherein the MCAVBM further includes an audio acquisition module (AAM) for acquiring the one or more audio streams from the current host.

21. The method of claim 20, wherein the MCAVBM further includes a video acquisition module (VAM) for acquiring the one or more video streams from the current host.

22. The method of claim 1, wherein the current host carries out the collaboration with or without asymmetric audio and/or video streams based on processing capability of the current host and wherein asymmetric audio and/or video streams includes the audio and/or video streams coming from each end point being different from each other in format, frame rate, resolution, and bit rate as well as the audio and/or video streams going to each of the end points being different from each other in format, frame rate, resolution, bit rate, and composition as well as the audio and/or video streams either coming into the end point only or the audio and/or video streams going out of the end point only.

23. A system, comprising:
one or more media centric collaboration terminals (MCCTs); and
one or more terminals selected from the group consisting of video communication terminals (VCTs), voice over Internet protocol (IP) communication terminals (VoCTs), remote servers, remote streaming clients and/or appliances, machines and gadgets (AMGs), wherein the one or more MCCTs are communicatively connected to the one or more terminals via a communication network and wherein audio and/or video bridging of one or more audio and/or video streams originating from one of the one or more MCCTs designated as a current host along with any incoming audio and/or video streams from at least one of any remaining MCCTs designated as clients or the one or more terminals is enabled on the current host, via the communication network, wherein each of the one or more MCCTs includes a window management module (WMM), the WMM includes a window creation module for creating and assigning a window to each of a plurality of applications running on the current host.

24. The system of claim of 23, wherein the one or more audio and/or video streams are obtained by converting, digital content originating from the current host and wherein the digital content includes animation, audio, video, image, graphics and/or text.

25. The system of claim of 23, wherein each of the one or more MCCTs includes a media centric collaboration enabling audio and/or video bridging module (MCAVBM), an application programming interface (API) for application developers and an API for Internet service providers (ISPs), enterprise customers or any centralized controller.

26. The system of claim of 23, wherein the WMM further includes a window accessing module for accessing one or more input/output buffers associated with each of the plurality of applications to obtain a plurality of video streams associated with the plurality of applications and the WMM further includes an audio accessing module for accessing one or more input/output buffers associated with each of the plurality of applications to obtain a plurality of audio streams being played out by the plurality of applications.

27. The system of claim of 23, wherein the WMM further includes a window host control module for controlling the windows associated with the one or more audio and/or video streams of the plurality of audio and/or video streams of the current host and the one or more incoming audio and/or video streams.

28. The system of claim 23, wherein the WMM further includes a window client control module for enabling the MCCTs to control the windows of the one or more audio and/or video streams and the one or more incoming audio and/or video streams received by the one or more MCCTs.

29. The system of claim of 25, wherein the audio and/or video bridging, on the current host, of the one or more audio and/or video streams originating from the current host along with the incoming audio and/or video streams from the at least one of any remaining MCCTs designated as the clients or the one or more terminals, via the communication network, is enabled by the MCAVBM.

30. The system of claim of 29, wherein the MCAVBM includes an audio receive module (ARM) for enabling the current host to receive multiple audio streams and de-jitter each audio stream independently, wherein the MCAVBM further includes an audio decode module (ADM) for decoding fully or partially each de-jittered audio stream and wherein the MCAVBM further includes an audio render module (AREM) to render the audio streams on the current host.

31. The system of claim of 30, wherein the MCAVBM further includes a video receive module (VRM) for enabling the current host to receive multiple video streams and de-jitter each video stream independently, wherein the MCAVBM further includes a video decode module (VDM) for decoding fully or partially each de-jittered video stream and wherein the MCAVBM further includes a video render module (VREM) to render the video streams on the current host.

32. The system of claim of 31, wherein the MCAVBM further includes an audio and/or video synchronization module (AVSM) for synchronizing decoded audio and corresponding video streams of corresponding terminal connected to the current host before local play out and wherein the AVSM further synchronizes the audio and/or video streams before encoding and streaming out to each of the remaining MCCTs designated as the clients and the one or more terminals.

33. The system of claim of 25, wherein the MCAVBM further includes an audio processing and mixing module (APMM) for post processing the audio stream coming from the at least one of the remaining MCCTs designated as the clients or the one or more terminals before playback and/or re-encoding and wherein the APMM produces a separate audio stream specific to each of the remaining MCCTs designated as the clients and the one or more terminals by removing an audio stream originating from a selected set of the remaining MCCTs designated as the clients and the one or more terminals and mixing the audio streams coming from one or more other remaining MCCTs designated as the clients and the one or more terminals.

34. The system of claim of 33, wherein the set of the remaining MCCTs designated as the clients and the one or more terminals is selected based on user configuration.

35. The system of claim of 34, wherein the MCAVBM further includes a video processing and composing module (VPCM) for processing and composing the decoded video streams received from the VDM, wherein processing the decoded video streams includes resizing the video streams, wherein the VPCM composes the decoded video streams selectively to each of the remaining MCCTs designated as the clients and the one or more terminals based on a user defined criteria, wherein composing the decoded video streams includes selectively tiling the video streams, and wherein the VPCM further composes decoded video streams selectively to each of the remaining MCCTs designated as the clients and the one or more terminals by combining output buffers of one or more of a plurality of applications along with region information and wherein the VPCM further performs a differential frame rate composition of different windows of the plurality of applications within a lager 'tiled' window.

36. The system of claim of 35, wherein the MCAVBM further includes an audio encode module (AEM) for encoding each of the audio streams coming from the APMM, separately, in a format required by each of the associated remaining MCCTs designated as the clients and the one or more terminals, wherein the MCAVBM further includes an audio send module (ASM) for receiving each of the audio streams from the AEM and sending the encoded audio streams to each of the associated remaining MCCTs designated as the clients and the one or more terminals and wherein the ASM sends a selected set of audio streams to the remote servers via the communication network.

37. The system of claim of 36, wherein the MCAVBM further includes a video encode module (VEM) for encoding each of the composed video streams coming from the VPCM in a format supported by each of the associated remaining MCCTs designated as the clients and the one or more terminals and wherein the MCAVBM further includes a video send module (VSM) for receiving each of the encoded video streams from the VEM and sending them to the associated remaining MCCTs designated as the clients and the one or more terminals via the communication network and wherein the VSM further sends encoded video streams to the remote servers, via the communication network, for broadcasting, re-distribution, real-time view by authorized people, storing for archival and/or non real-time play-out by the authorized people.

38. The system of claim of 37, Wherein the MCAVBM further includes an audio acquisition module (AAM) for acquiring the one or more audio streams from the current host.

39. The system of claim of 38, wherein the MCAVBM further includes a video acquisition module (VAM) far acquiring the one or more video streams from the current host.

40. A non-transitory computer-readable storage medium having instructions that when executed by a computing device, cause the computing device to:
- communicatively connect one or more media centric collaboration terminals (MCCTs) to one or more terminals selected from the group consisting of video communication terminals (VCTs), voice over Internet protocol (IP) communication terminals (VoCTs), remote servers, remote streaming clients and/or appliances, machines and gadgets (AMGs) via a communication network; and
- enable audio and/or video bridging, on one of the one or more MCCTs designated as a current host, of one or more audio and/or video streams originating from the current host along with any incoming audio and/or video streams from at least one of any remaining MCCTs designated as the clients or the one or more terminals, via the communication network, wherein each of the one or more MCCTs includes a window management module (WMM), the WMM includes a window creation module for creating and assigning a window to each of a plurality of applications running on the current host.

41. The non-transitory computer-readable storage medium of claim 40, wherein the instructions cause the computing device to:
- obtain the one or more audio and/or video streams by converting digital content originating from the current host.

42. A method, comprising:
- communicatively connecting one or more media centric collaboration terminals (MCCTs) to one or more terminals selected from the group consisting of video communication terminals (VCTs), voice over Internet protocol (IP) communication terminals (VoCTs), remote servers, remote streaming clients and/or appliances, machines and gadgets (AMGs) via a communication network; and
- enabling audio and/or video bridging, on one of the one or more MCCTs designated as a current host, of one or more audio and/or video streams originating from the current host along with an incoming audio and/or video streams from at least two or more of any remaining MCCTs designated as clients and the terminals, via the communication network, wherein each of the one or more MCCTs includes a window management module (WMM), the WMM includes a window creation module for creating and assigning a window to each of a plurality of applications running on the current host.

* * * * *